United States Patent
Sheldon et al.

(10) Patent No.: US 6,590,603 B2
(45) Date of Patent: Jul. 8, 2003

(54) SYSTEM AND METHOD FOR MANAGING STREAMING DATA

(75) Inventors: Robert D. Sheldon, Austin, TX (US); Benton B. Maples, Austin, TX (US)

(73) Assignee: Forgent Networks, Inc., Austin, TX (US)

(*) Notice: Subject to any disclaimer, the term of this patent is extended or adjusted under 35 U.S.C. 154(b) by 0 days.

(21) Appl. No.: 10/002,700

(22) Filed: Oct. 31, 2001

(65) Prior Publication Data
US 2003/0081112 A1 May 1, 2003

(51) Int. Cl.[7] .................................................. H04N 7/14
(52) U.S. Cl. ................................. 348/14.09; 348/14.08; 709/204
(58) Field of Search ........................... 348/14.01, 14.02, 348/14.03, 14.04, 14.05, 14.07, 14.08, 14.09, 14.1, 14.11, 14.12, 14.13; 370/260; 709/204

(56) References Cited

U.S. PATENT DOCUMENTS 6,006,253 A * 12/1999 Kumar et al. ............... 709/204
6,356,295 B1 * 3/2002 Mano ....................... 348/14.09

FOREIGN PATENT DOCUMENTS

JP          403216051 A  *  9/1991  ............ H04M/3/56

* cited by examiner

Primary Examiner—Melur Ramakrishnaiah
(74) Attorney, Agent, or Firm—Hamilton & Terrile, LLP; Robert W. Holland

(57) ABSTRACT

The present invention discloses a system for managing streaming data. The system includes a management module and a processing module. The processing module includes a CODEC and a streaming appliance. The CODEC connects to a MCU, receives video conference data, and decompresses video conference data. The streaming appliance functions to receive video conference data, format video conference data for streaming, and send streaming video conference data to a selected network address. The management module functions to selectively manage the CODEC and the streaming appliance and their communication with associated systems. More particularly, the streaming appliance may be a web server that functions to transmit video conference data to a selected internet address.

20 Claims, 3 Drawing Sheets

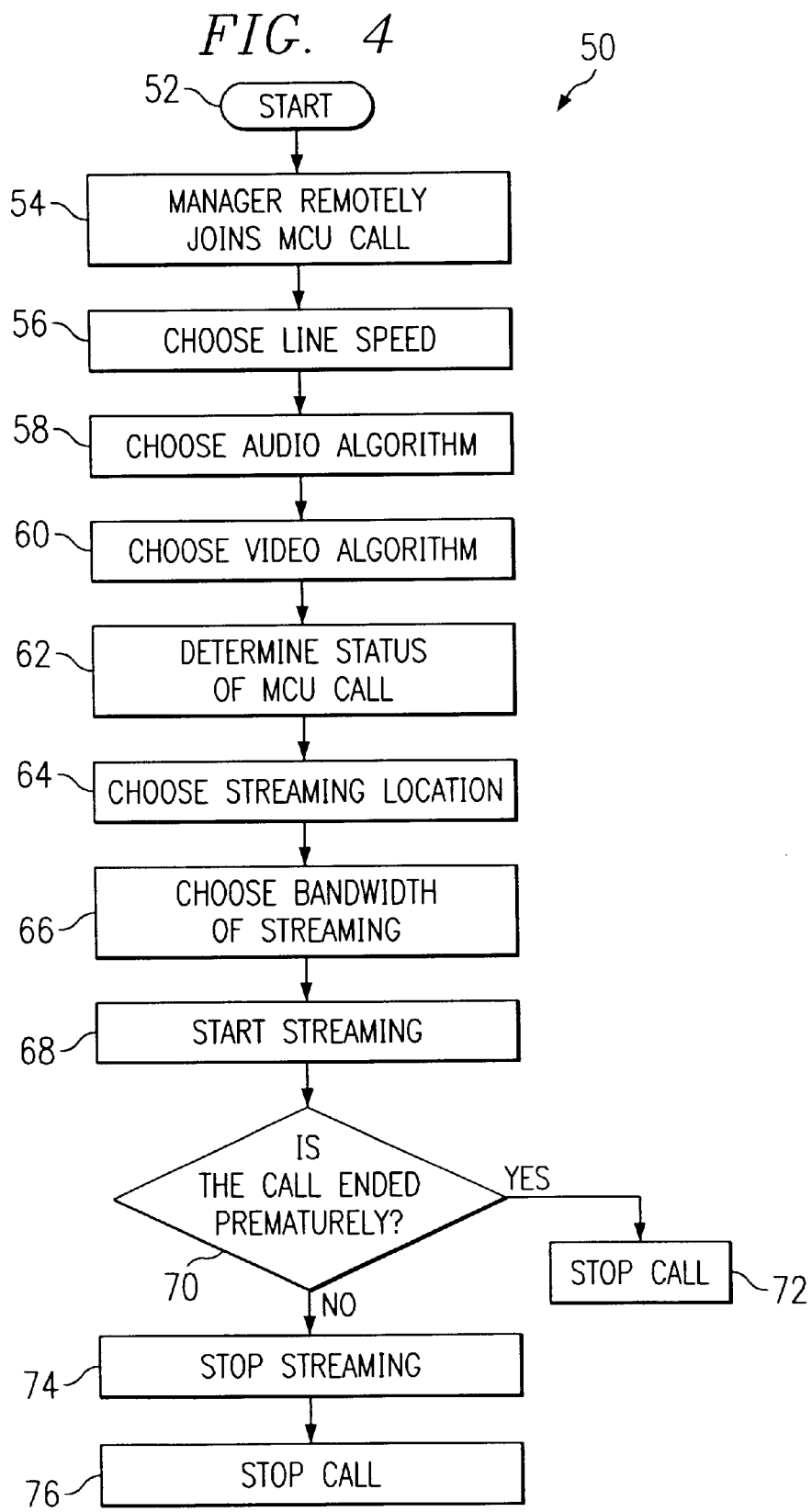

SYSTEM AND METHOD FOR MANAGING STREAMING DATA

TECHNICAL FIELD

The following invention relates in general to the field of network management and more particularly to a system and method for managing streaming data.

BACKGROUND

Video conferencing is increasingly employed to facilitate communication between parties in different locations. Current video conferencing technology allows video and audio information, captured at various video network endpoints, to be selectively shared among video conference participants. The benefits of video conferencing include not only enhanced audio and video communication but also include an elimination of the time and expense of travel. However, as the number of participants in the video conference increases, a number of difficulties can limit the efficiency of sharing the video conference information with all participants. Specifically, as the number video conferencing endpoints involved within a specific video conference increases, the bandwidth necessary for transmitting the video conference is often prohibitive.

In certain applications, video conference participants may be roughly divided into two groups: active participants and passive participants. Active participants may be categorized as those video conference participants who are actively speaking; on the other hand, passive participants are categorized as those participants who are primarily viewing or watching the video conference. For example, a panel discussion may include several active participants who may or may not be located at different locations. The panel discussion may also have an interested audience made up of multiple passive participants at various locations. In a traditional video conference setting, broadcasting this video conference to all participants would require the traditional broadcast of video conferencing to all sites. Accordingly, if the number of active and passive participants were in a multiple different physical locations, this broadcast would require a significant amount of bandwidth and telecommunication resources. However, this is not an effective use of resources because the passive participants are not taking full advantage of the resources available.

SUMMARY

Therefore a need has arisen for an efficient system and method for distributing video conference data to multiple passive participants.

A further need has arisen for a system and method for managing streaming video conference data to multiple passive participants.

In accordance with teachings of the present disclosure, a system and method are described for managing and distributing video conference data. In one embodiment the system includes a Multipoint Control Unit (MCU) connected to a plurality of active participant end points to facilitate a video conference between the active participant end points. The system also includes a processing module, including a CODEC and a streaming appliance, that can be connected to an MCU through a network. The CODEC acts to receive compressed video conference data from the MCU and decompress that video conference data. The streaming appliance acts to receive video conference data from the CODEC and format the video conference data so it can be streamed. The system also includes a management module connects to the processing module and manages the CODEC and the streaming appliance. The management module may direct the streaming appliance to stream formatted video conference data to a particular network location. The management module may select an audio standard for the transmission between the MCU and the processing module and also select a video standard for the transmission between the MCU and the processing module.

In another aspect the present invention discloses a system for managing streaming data is disclosed. The system includes a management module and a processing module. The processing module includes a CODEC and a streaming appliance. The CODEC connects to a MCU through a network, receives video conference data, and decompresses video conference data. The streaming appliance functions to receive video conference data, format video conference data for streaming, and send streaming video conference data to a selected network address. The management module functions to selectively manage the CODEC and the streaming appliance and their communication with associated systems. More particularly, the streaming appliance may be a web server that functions to transmit video conference data to a selected internet address.

The present disclosure provides a number of important technical advantages. One technical advantage is providing a management module and a processing module. The processing module and management module facilitate the efficient transmission of video conference data to multiple passive participants.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 is a flow diagram of a method for managing streaming video conference data according to the present invention.

DETAILED DESCRIPTION

Figure 1:
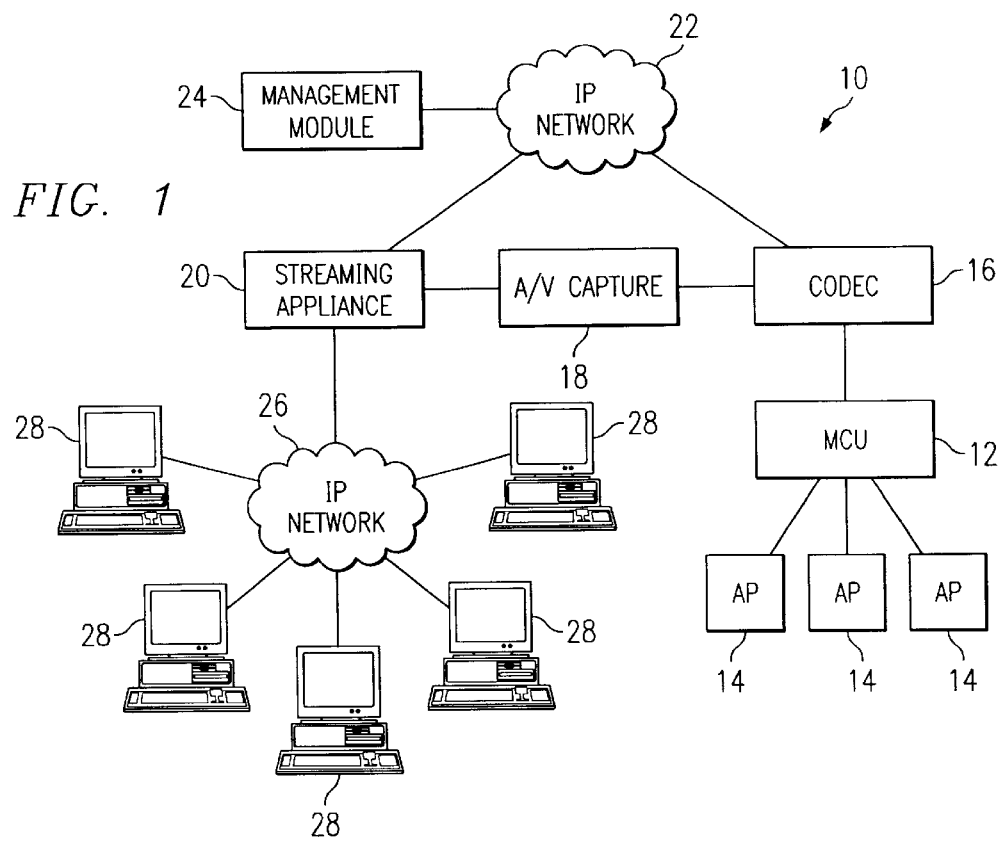
FIG. 1 is a depiction of a network for communicating video conference data incorporating teachings of the present invention.

Now referring to FIG. 1, showing a network, depicted generally at 10, according to the present invention. Network 10 includes multi-point control unit (MCU) 12 connected to three active participant endpoints 14. Each active participant endpoint 14 is operable to capture audio-and video data from a participant located proximate to each active participant endpoint 14. Each active participant endpoint 14 is preferably connected to MCU 12 such that audio and video data captured by active participant endpoints 14 may be sent to MCU 12. In the present embodiment, MCU 12 is shown connected to three active participant endpoints 14. The present invention further contemplates alternate embodiments in which the number and arrangement of active participant endpoints 14 connected to MCU 12 may vary significantly.

MCU 12 is operable to receive audio and video data from each active participant endpoint 14 and selectively connect active participant endpoints 14 such that communication between the active participant endpoints 14 may be achieved. Preferably, MCU 12 may processes the audio and video data for transmission. In some instances, this processing may include compression of the audio and video data. Additionally, MCU 12 may perform a variety of functions related to the manner in which endpoints 14 are connected, such as using audio signals to focus on a particular speaker or in combining the images of the active participant endpoints in order to allow all video conference participants to see and hear all or selected other video conference participants simultaneously.

MCU 12 is preferably connected with CODEC 16 through a network. CODEC 16 is preferably operable to receive audio and video data, which may also be referred to as video conference data, from MCU 12 and decode or decompress received video conference data received from MCU 12. In one particular embodiment, CODEC 16 may decompress the video conference data received from MCU 12, resulting in analog audio and video signals. CODEC 16 may also be referred to as a coder/decoder or a compressor/decompressor. In the present embodiment.CODEC 16 may be embodied either as a dedicated hardware component or as a set of software instructions contained on a component such as a PC, a server, or a workstation. In the present embodiment, CODEC 16 is preferably connected to network 22 and A/V capture module 18. The connection between CODEC 16 and MCU 12 may be, for example, an internet protocol (IP) or an integrated services digital network (ISDN) connection.

Information sent between MCU 12 and CODEC 16 is preferably sent according to applicable standards such as those promulgated by the International Telecommunications Union (ITU). For example, video conference data sent via an ISDN connection between MCU 12 and CODEC 16 would be sent according to ITU standard H.320. Video conference data sent between MCU 12 and CODEC 16 via an IP connection may preferably be sent in accordance with ITU standard H.323. Alternatively, video or audio video conference data may be sent according to any other suitable standard.

A/V capture component 18 is preferably connected to streaming appliance 20. A/V capture component 18 preferably provides an audio in and video in input and a video out and audio out output to facilitate transfer of data between CODEC 16 and streaming appliance 20. Preferably, A/V capture component 18 transmits the decoded or decompressed video conference data as analog audio and video signal to A/V capture component 18. A/V capture component 18 then formats the analog audio and video signals, converting those signals to a format appropriate for streaming appliance 20, such as video for Windows. A/V capture component 20 may be a dedicated hardware component or may be a software streaming application such as VTEL Turbocast.

In the present embodiment, streaming appliance 20 is. preferably connected to network 22 and network 26. IP network 22 may comprise an internal IP network. In an alternative embodiment, network 22 may be any suitable network for facilitating network communication between streaming appliance 20, CODEC 16 and other applicable components such as management module 24. Management module 24 is also connected to IP network 22. Management module 24 preferably provides an interface for a network administrator or another suitable user to interface with streaming appliance 20 and CODEC 16. Management module 24 may preferably act to control the input and transmission of video and audio data into and out of CODEC 16 and streaming appliance 20. Management module 24 may further operate as a dedicated hardware module or may operated as software on a PC, server or workstation such that a system administrator or other suitable user may effectively interface and manage streaming appliance 20 and CODEC 16.

Management module 24 preferably allows a network administrator or other suitable user to effectively manage the streaming of video conference data. For instance, management module 24 may direct CODEC 16 to remotely join an existing video conference on MCU 12. Management module 24 may further select an appropriate line speed for the transfer of data between MCU 12 and CODEC 16. Management module 24 may also select appropriate audio and video algorithms for the formatting of data to be transferred between MCU 12 and CODEC 16. In one embodiment, management module 24 may periodically determine the status of the selected video conference. Further, management module 24 may further direct streaming appliance 20 to stream received audio video conference data to network 26 such that it will be available to passive participants. In one embodiment, management module may also select a streaming bandwidth and may direct steaming appliance 20 to stream video conference data to one or more selected network addresses.

Streaming appliance 20 may be a stand alone streaming appliance or streaming appliance 20 may be embodied in a PC, a server or a workstation. In a preferred embodiment, streaming appliance 20 is a network server. In another preferred embodiment, streaming appliance 20 is a web server operable to stream data to a web site on the Internet. Streaming appliance 20 may preferably receive video conference data from CODEC 16 via A/V capture component 18. Streaming appliance 20 preferably is operable to format the video conference data to allow the streaming of that data to a network address. Streaming appliance 20 may receive streaming instructions from management module 24 directing streaming appliance 20 to stream the video conference data to one or more network addresses. In one particular embodiment the network address may include a web site address. Streaming appliance 20 may further receive instructions from management module 24 to begin, pause, or end the streaming of the video conference to a selected network address.

In the present embodiment streaming appliance 20 is operable to stream video conference data to network 26. Network 26 may be an IP network such as an intranet. Network 26 is preferably accessible to plurality of passive participant endpoints 28. Passive participant endpoints 28 may preferably gain access to network addresses on network 26 via a browser such as Microsoft Internet Explorer or Netscape Navigator or another suitable browser. As streaming appliance 20 streams video conference data to a selected network address on network 26, passive participant end points may preferable access the video conference data. Providing the video conference data to passive participant end points 28 is advantages because the bandwidth required for passive participant end points 28 to participate in the video conference is reduced.

Figure 2:
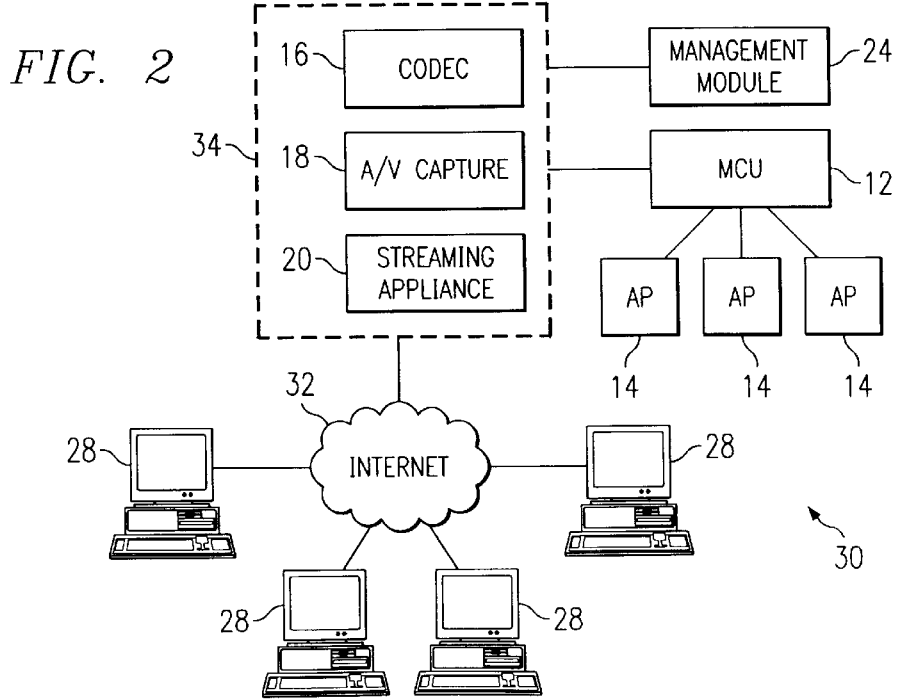
FIG. 2 is a depiction of a network incorporating teachings of the present invention including a processing module.

Now referring to FIG. 2, a network, indicated at 30, showing a system for managing video conference data according to the present invention. Network 30 includes MCU 12 coupled to a plurality of active participant endpoints 14. MCU 12 is preferably coupled to processing module 34. Processing module 34 is preferably an integrated device incorporating CODEC 16, A/V capture component 18, and streaming appliance 20. Further, in the present embodiment processing module 34 is directly connected with management module 24, to manage CODEC 16, and streaming appliance 20 as described in FIG. 1. Processing module 34 is also preferably coupled to Internet 32. Internet 32 is preferably coupled to a plurality of passive participant endpoints 28. In the present embodiment, management module 34 may preferably direct streaming appliance to stream video conference to an Internet 32 web address accessible to passive participant end points 28.

Figure 3:
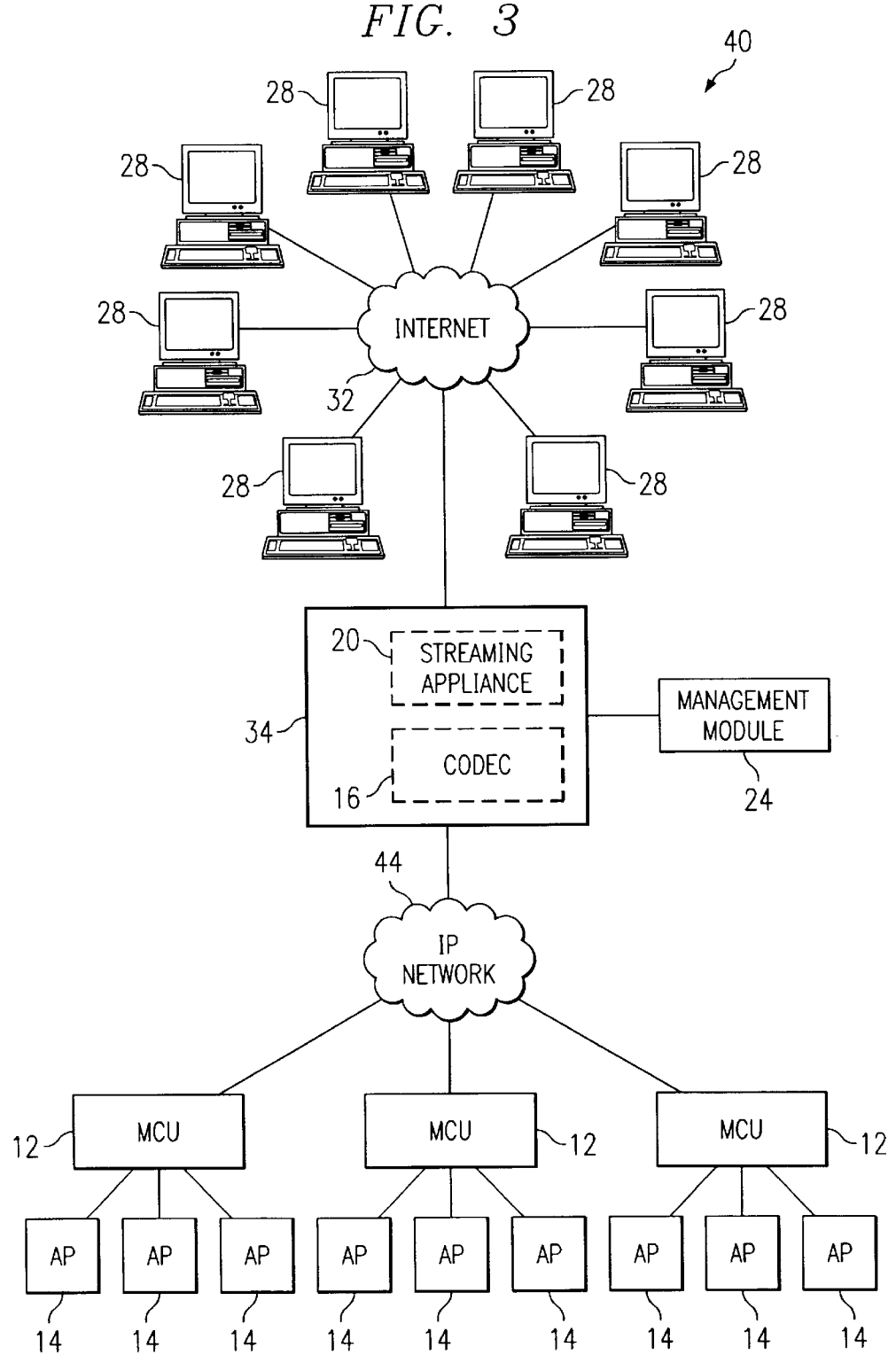
FIG. 3 is a depiction of a network incorporating teachings of the present invention including a processing module connected to a plurality of MCUs.

Now referring to FIG. 3, a network indicated generally at 40 containing a system for managing video conference data from a plurality of MCUs, according to the present invention. Network 40 includes a processing module 34 connected to network 44. Network 44 operably connects a plurality of MCUs 12, each connected to a plurality of active participant endpoints 14. Processing module 34 preferably includes CODEC 16, A/V capture device 18 and streaming appliance 20. In the present embodiment, processing module 34 is operable to receive video conference data from plurality of MCUs 12. Accordingly, processing module 34 may manage incoming video conferencing data from a plurality of active participant endpoints 14 through MCUs 12 and via network 44. In the present embodiment, network 44 may be an IP network or another suitable communication network. Management module 24 may direct processing module 34 to join a video conference managed by one or more MCUs 12. After receiving video conferencing data from one or more MCUs, processing module 34 may transmit the received and formatted video conference data at the direction of management module 24 to Internet 32. Internet 32 preferably connects a plurality of passive participant endpoints 28, allowing passive participant endpoints 28 access to the videoconference data.

Now referring to FIG. 4, a flow diagram of a method for managing video conference data according to the present invention is shown. The method begins at 52 and a manager may remotely join a video conference call being managed by an MCU 54. Next the management module may select an appropriate linespeed for the transfer of information from the MCU module 56. Following this step, management module may direct the selection of an audio algorithm 58 and select video algorithm 60. Audio algorithms may be, for instance, video and audio algorithms developed according to ITU standards such as G.722 or G.728, standards for audio signals, or H.320 or H.323, standards for video signals or other applicable and suitable video or audio signals. Next, management module may determine the status of an MCU call 62. Following this step, management module may choose a network address location for the streaming appliance to stream the video conference information 64. Management module may also select the bandwidth of the streaming signal 66. Next, management module may direct the streaming appliance to begin streaming the video conference data 68. Next, if the video conference call ends prematurely 70, the call will be stopped 72 and streaming of the video conference will also cease. However, if the video conference call is not ended prematurely, at the time designated by the management module, the streaming appliance will stop streaming 74 and the call will be stopped 76.

Although the disclosed embodiments have been described in detail, it should be understood that various changes, substitutions and alterations can be made to the embodiments without departing from their spirit and scope.

What is claimed is:

1. A system for managing and distributing video conference data comprising:
   a Multipoint Control Unit (MCU) operable to connected to a plurality of active participant end points, the Multipoint Control Unit operable to facilitate a video conference between the active participant end points;
   a processing module operably connected to the MCU, the processing module comprising a CODEC and a streaming appliance;
   the CODEC operable to:
     receive compressed video conference data from the MCU; and
     decompress received compressed video conference data;
   the streaming appliance operable to:
     receive video conference data;
     format video conference data for streaming;
     selectively stream formatted video conference data; and
   a management module operably connected to the processing module and operable to selectively manage the CODEC and the streaming appliance.

2. The system of claim 1 further comprising the management module operable to select a linespeed in the connection between the processing module and the MCU.

3. The system of claim 1 further comprising the management module operable to:
   select an audio standard for transmission between the MCU and the processing module; and
   select a video standard for transmission between the MCU and the processing module.

4. The system of claim 1 further comprising the management module operable to select a network address for the streaming appliance to stream video conference data, the network address available to a plurality of passive participant endpoints.

5. The system of claim 4 further comprising the management module operable to:
   selectively initiate streaming video conference data to the network address; and
   selectively end the streaming of video conference data to the network address.

6. The system of claim 4 further comprising the management module operable to:
   selectively store video conference data; and
   selectively initiate streaming stored video conference data to the selected network address.

7. The system of claim 4 wherein the network address further comprises an Internet Protocol network address.

8. The system of claim 4 wherein the network address further comprises a website address.

9. The system of claim 1 further comprising the CODEC and streaming appliance associated in a common component.

10. The system of claim 1 wherein the CODEC and the streaming appliance further comprise separate respective components.

11. The system of claim 1 further comprising:
    the management module operable to connect to and manage a plurality of processing modules; and
    each processing module operable to interface with a plurality of MCUs.

12. A system for managing streaming data comprising:
    a processing module comprising a CODEC and a streaming appliance;

the CODEC operable to:
  connect to a multipoint control unit (MCU);
  receive video conference data, and
  decompress video conference data;
the streaming appliance operable to:
  receive video conference data;
  format video conference data for streaming; and
  send streaming video conference data to a selected network address; and
a management module operably connected to the processing module further operable to selectively manage the CODEC and the streaming appliance.

13. The system of claim 11 further comprising the management module connected to the processing module over a network.

14. The system of claim 11 wherein the streaming appliance further comprises a streaming server.

15. The system of claim 11 wherein the streaming appliance further comprises a web server operable to transmit video conference data to a selected internet address.

16. The system of claim 11 further comprising the CODEC and streaming appliance associated in a common component.

17. The system of claim 11 wherein the CODEC and the streaming appliance further comprise separate respective components.

18. A method for managing video conference data comprising;

capturing video conference data at active participant end points;

sending the captured video conference data in a compressed format to an MCU;

receiving the video conference data at a processing module interfaced with the MCU;

decompressing the video conference data at the processing module; and selectively streaming the video conference data from the processing module to a network address for viewing by passive participants to the video conference.

19. The method of claim 18 further comprising:

initiating the streaming of video conference data at a management module associate with the processing module.

20. The method of claim 18 wherein streaming the video conference data further comprises streaming the video conference data to an Internet web site.

* * * * *